(12) United States Patent
Green et al.

(10) Patent No.: US 10,800,687 B2
(45) Date of Patent: Oct. 13, 2020

(54) NITRATE REMOVAL

(71) Applicant: TECHNION RESEARCH & DEVELOPMENT FOUNDATION LIMITED, Haifa (IL)

(72) Inventors: Michal Green, Haifa (IL); Sheldon Tarre, Kibbutz Yagur (IL); Razi Epsztein, Kfar Tavor (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 15/753,005

(22) PCT Filed: Aug. 15, 2016

(86) PCT No.: PCT/IL2016/050888
§ 371 (c)(1),
(2) Date: Feb. 15, 2018

(87) PCT Pub. No.: WO2017/029659
PCT Pub. Date: Feb. 23, 2017

(65) Prior Publication Data
US 2019/0002319 A1 Jan. 3, 2019

(30) Foreign Application Priority Data
Aug. 17, 2015 (IL) .......................... 240631

(51) Int. Cl.
*C02F 3/28* (2006.01)
*C02F 101/16* (2006.01)

(52) U.S. Cl.
CPC ...... *C02F 3/2806* (2013.01); *C02F 2101/163* (2013.01); *C02F 2209/03* (2013.01); *C02F 2209/06* (2013.01); *C02F 2301/046* (2013.01)

(58) Field of Classification Search
CPC .... C02F 3/302; C02F 2209/06; C02F 3/2806; C02F 3/305
USPC ................................................ 210/615, 903
See application file for complete search history.

(56) References Cited

U.S. PATENT DOCUMENTS

| | | | |
|---|---|---|---|
| 7,186,340 B1* | 3/2007 | Rittmann | C02F 3/102 210/604 |
| 7,338,597 B1 | 3/2008 | Rittman et al. | |
| 2010/0200500 A1* | 8/2010 | Rezania | B01F 3/04099 210/614 |
| 2012/0178147 A1 | 7/2012 | Krajmalnik-Brown et al. | |
| 2014/0083941 A1* | 3/2014 | Le Tallec | C02F 3/10 210/618 |
| 2015/0284280 A1* | 10/2015 | Huang | C02F 9/00 210/631 |

OTHER PUBLICATIONS

Vasiliadou et al, Experimental and modelling study of drinking water hydrogenotrophic denitrification in packed-bed reactors, Journal of Hazardous Materials 165, pp. 812-824. (Year: 2008).*

(Continued)

*Primary Examiner* — Claire A Norris
(74) *Attorney, Agent, or Firm* — The Roy Gross Law Firm, LLC; Roy Gross

(57) ABSTRACT

A reactor closed to the atmosphere and method using same for nitrate removal are disclosed.

18 Claims, 8 Drawing Sheets

(56) References Cited

OTHER PUBLICATIONS

Kurt, M., Dunn, I.J., Bourne, J.R., 1987. Biological denitrification of drinking water using autotrophic organisms with H (2) in a fluidized-bed biofilm reactor. Biotechnol. Bioeng. 29, 493-501.

Vasiliadou, I. a, Karanasios, K. a, Pavlou, S., Vayenas, D. V, 2009. Experimental and modelling study of drinking water hydrogenotrophic denitrification in packed-bed reactors. J. Hazard. Mater. 165, 812-24. doi:10.1016/j.ihazmat.2008.10.067.

Ergas, S.J., Reuss, A.F., 2001. Hydrogenotrophic denitrification of drinking water using a hollow fibre membrane bioreactor. J. water supply Res. Technol. 50.3, 161-171.

Hwang, J.H., Cicek, N., Oleszkiewicz, J. a, 2010. Achieving biofilm control in a membrane biofilm reactor removing total nitrogen. Water Res. 44, 2283-91. doi:10.1016/j.watres.2009.12.022.

Lee, K.-C., Rittmann, B.E., 2002. Applying a novel autohydrogenotrophic hollow-fiber membrane biofilm reactor for denitrification of drinking water. Water Res. 36, 2040-52.

Zhao, H.P., Valencia, A.O., Tang, Y., Kim, B.O., Vanginkel, S., Friese, D., Overstreet, R., Smith, J., Evans, P., Brown, R.K., Rittmann, B., 2014. Removal of multiple electron acceptors by pilot-scale, two-stage membrane biofilm reactors. Water Res. 54, 115-122.

Lee, K.-C., Rittmann, B.E., 2003. Effects of pH and precipitation on autohydrogenotrophic denitrification using the hollow-fiber membrane-biofilm reactor. Water Res. 37, 1551-1556. doi:10.1016/S0043-1354(02)00519-5.

\* cited by examiner

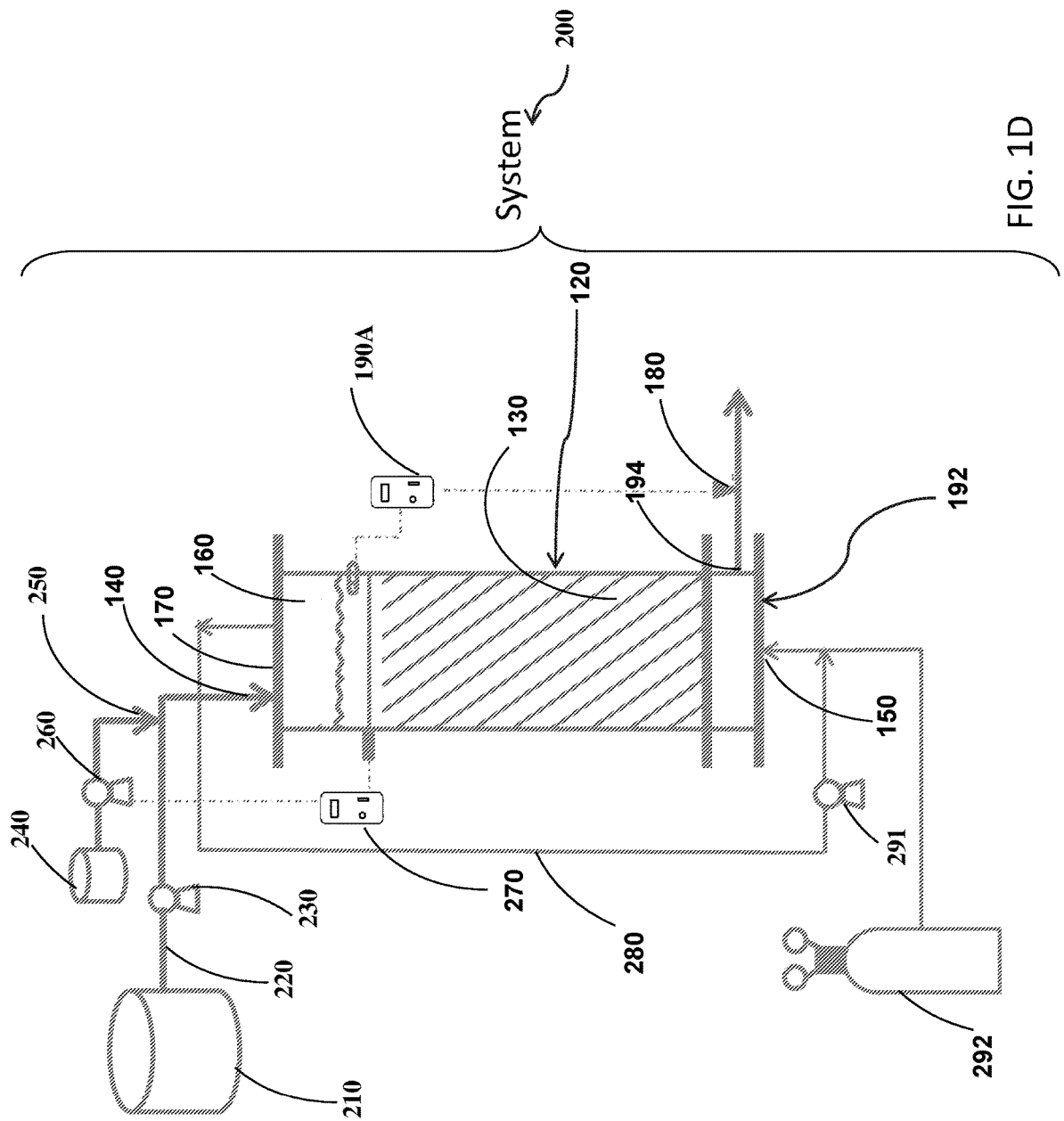

NITRATE REMOVAL

RELATED APPLICATIONS

This application is a National Phase of PCT Patent Application No. PCT/IL2016/050888 having International filing date of Aug. 15, 2016, which claims the benefit of priority from Israeli Patent Application No. 240631, filed on Aug. 17, 2015. The contents of the above applications are all incorporated by reference as if fully set forth herein in their entirety.

FIELD OF INVENTION

The invention relates to the field of water treatment, and more specifically, but not exclusively to removal of nitrate from water.

BACKGROUND OF THE INVENTION

Biological denitrification of nitrate-contaminated groundwater has been widely investigated with both heterotrophic (Liu et al., 2012; Mohseni-Bandpi et al., 2013) and autotrophic (Zhu and Getting, 2012) cultures. The more common process of heterotrophic denitrification, where nitrate is reduced by various organic compounds, is characterized by high efficiency and high denitrification rates (Matĕjů et al., 1992). However, the main drawbacks of biological denitrification of drinking water using heterotrophic cultures are the potential risk of microbial contamination of the treated water, the presence of residual carbon source and microbial products, excess waste biomass and reactor clogging, formation of disinfection by-products (DBP) and costly post treatment (Cliford and Liu, 1993).

Autotrophic denitrification, using reduced inorganic compounds as the electron donor and $CO_2$ as carbon source, overcomes most of the above disadvantages. Autotrophic systems have significantly less biomass growth and higher quality effluents (lower organics). Therefore, reactor clogging, waste sludge production and post treatment costs are reduced. Autotrophic denitrification using hydrogen gas, also named hydrogenotrophic denitrification, is characterized by clean nature and low biomass yield, wherein hydrogen does not persist in the treated water. Moreover, hydrogen is less expensive than typical organic electron donors. However, the main drawbacks limiting the use of hydrogenotrophic denitrification are safety concerns, poor hydrogen utilization and low denitrification rates due to low solubility of hydrogen with the resulting low transfer rate (Karanasios et al., 2010).

Most of the investigated fixed/fluidized bed hydrogenotrophic systems lack efficient and safe delivery of hydrogen and present the same $H_2$ provision scheme of gas sparging either in a separate hydrogen saturation tank (Kurt et al., 1987) or directly to the reactor (Vasiliadou et al., 2009). Membrane biofilm reactors (MBfRs) and bio electrochemical reactors (BERs) were both designed to enable efficient, safe and high rate hydrogen delivery to biofilm. The MBfR technology has been proved on both pilot scale and even full scale. However, results from MBfRs reveal low denitrification rates due to the limited surface area available for biofilm growth (Ergas and Reuss, 2001; Hwang et al., 2010; Lee and Rittmann, 2002; Zhao et al., 2014). Moreover, MBfRs are costly due to the high energy consumption and the cost of membrane replacement/cleaning because of fouling (Lee and Rittmann, 2003). BERs also suffers from limited surface area available for biofilm growth and low denitrification rates (Feleke and Sakakibara, 2002; Mousavi et al., 2012; Zhou et al., 2007). Additionally, a gradual scale formation on the surface of the cathode suppresses hydrogen production (Szekeres et al., 2001).

SUMMARY OF THE INVENTION

The invention relates to the field of water treatment, and more specifically, but not exclusively to removal of nitrate from water.

According to an aspect of some embodiments of the present invention, there is provided a reactor comprising a container configured to contain one or more carriers configured to allow a growth of denitrifying bacterial biofilm; a water inlet configured to provide contaminated water to the reactor, and a gas inlet configured to direct a flow of gas into the reactor, wherein: the reactor provides with a headspace that seals the inner volume of the reactor to the atmosphere, and the reactor being devoid of a gas-phase passage allowing the gas exiting therefrom.

Optionally, the reactor further comprises a collecting unit which defines a part of, or is disposed in fluid communication with the container.

Optionally, the reactor further comprises an outlet line disposed in fluid communication with the collecting unit.

Optionally, the reactor further comprises a valve, wherein the valve is disposed in the outlet line and is configured to allow purified water to exit the reactor.

Optionally, the flow of gas comprises hydrogen.

Optionally, the carriers are characterized by a surface area that ranges from 100 to 1000 $m^2/m^3$.

According to an aspect of some embodiments of the present invention, there is provided a system comprising the disclosed reactor.

Optionally, the system or the reactor further comprises a gas pressure controlling valve.

Optionally, the system or the reactor further comprises a pH controlling unit.

Optionally, the system or the reactor further comprises a pressure sensor.

Optionally, the system further comprises a pipe configured to recirculate the water from the collecting unit to the upper part of the reactor.

Optionally, the system comprises a pipe configured to recirculate gas from the headspace to the collecting unit or to a lower part of the reactor.

Optionally, the system further comprises an external reactor or a container.

Optionally, the external reactor or container is open to the atmosphere and is in fluid communication to the reactor provided with the headspace.

Optionally, the system further comprises a pipe configured to recirculate the water from the external reactor or container to the reactor provided with the headspace.

According to an aspect of some embodiments of the present invention, there is provided a method of denitrifying water, the method comprising operating a reactor comprising the steps of: providing a reactor, wherein said reactor comprises: a container, the container containing one or more carriers, the carriers comprising denitrifying bacterial biofilm thereon; a water inlet and a gas inlet; and wherein said reactor provides with a headspace that seals the inner volume of said reactor to the atmosphere, and the reactor is devoid of a gas-phase passage allowing the gas exiting therefrom;

introducing nitrate contaminated water to said reactor from the water inlet thereby contacting a contaminated water with the carriers comprising denitrifying bacterial biofilm thereon, and introducing a gas into said reactor from said gas inlet, thereby denitrifying the water.

Optionally, the method further comprises the steps of introducing nitrate contaminated water to the reactor from the water inlet thereby contacting a contaminated water with the carriers comprising denitrifying bacterial biofilm thereon; and introducing a gas into the reactor.

Optionally, an inner volume of the reactor is pressurized by a total absolute pressure that ranges from 1 to about 12 bars.

Optionally, the denitrification rate is at least 0.2 gram $NO_3^-$—N/(Liter$_{reactor}$*day).

Optionally, the inner volume of the reactor is characterized by a total pressure of $H_2$ and $N_2$ that varies within a range of ±20%.

Optionally, the method further comprises keeping pH of the water at a value that ranges from about pH 6 to about 9 by acid addition into the reactor.

Optionally, a flow rate of the gas ranges from 0 to 7 gram $H_2$/(Liter$_{reactor}$*day).

Optionally, the method is performed in a recycle mode.

Optionally, the water exiting the reactor is characterized by $NO_3^-$—N having a concentration less than 20 mg per liter.

Optionally, the water exiting the reactor comprises a nitrogen gas, the nitrogen gas being in a concentration that ranges from 10 to 70 mg/L.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods, systems, and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 1A-D show schematic illustrations of the reactor (FIG. 1A) and a flow sheet of an exemplary systems containing the reactor (FIG. 1B-D).

DETAILED DESCRIPTION OF THE INVENTION

The present invention, in some embodiments thereof, relates to method for removal of nitrate from water, and reactors, or systems comprising thereof, capable of same.

Before explaining at least one embodiment of the invention in detail, it is to be understood that the invention is not necessarily limited in its application to the details set forth in the following description or exemplified by the Examples.

The invention is capable of other embodiments or of being practiced or carried out in various ways. The reactor and the system of the kind provided herein may comprise units with various water treatment functions. The choice of treatment functions to be included may be made based on the specific properties and quality of the water to be treated, on the basis of intended properties of the filtered water, based on regulatory requirements and many others. As will be appreciated, the system provided herein is not limited to a certain combination or configuration of water filtration units.

Figure 1A:
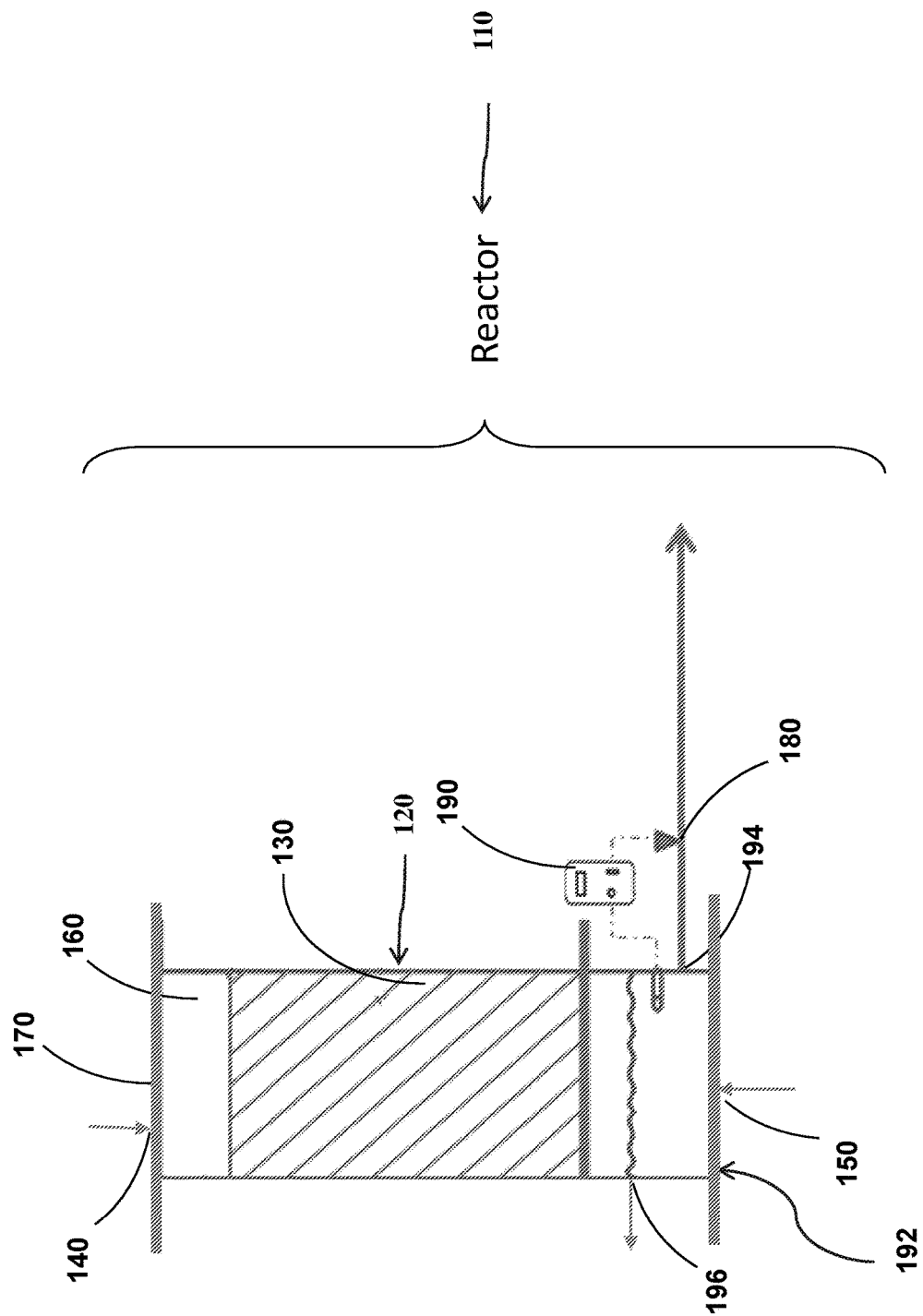

Reference is now made to FIG. 1A which shows a schematic illustration of an exemplary reactor.

According to one aspect of the present invention there is provided reactor 110 for removing nitrates from water. Reactor 110 may have a housing. The housing may be made of a rigid, durable material, such as, without limitation, aluminum, stainless steel, a hard polymer and/or the like. The housing may have a cylindrical, conical, rectangular or any other suitable shape. The housing may prevent unwanted foreign elements from entering thereto.

Reactor 110 may include container 120 configured to contain one or more carriers 130. Reactor 110 may have water inlet 140 configured to provide contaminated water to reactor 110.

Water inlet 140 may include or be connected to a pipe of various shapes and sizes, connected to, attached to or integrally formed with reactor 110. Water inlet 140 may allow contaminated water to pass to reactor 110. Water inlet may be outfitted with a pump, e.g., a feeding pump allowing to fluidize the water.

Reactor 110 may have gas inlet 150. Gas inlet 150 may be configured to direct a flow of gas from a source (e.g., a cylinder) into reactor 110. The gas may be e.g., hydrogen. Reactor 110 may provide with headspace 160. Headspace 160 may seal the inner volume of reactor 110 to the atmosphere. Reactor 110 may have seal 170. Seal 170 may define a headspace in reactor 110. Seal 170 may seal the inner volume of reactor 110 to the atmosphere.

In some embodiments, carriers 130 are characterized by a surface that ranges from 100 $m^2/m^3$ to 1000 $m^2/m^3$. In some embodiments, carriers 130 are characterized by a surface area of e.g., 100 $m^2/m^3$, 150 $m^2/m^3$, 200 $m^2/m^3$, 250 $m^2/m^3$, 300 $m^2/m^3$, 350 $m^2/m^3$, 400 $m^2/m^3$, 450 $m^2/m^3$, 500 $m^2/m^3$, 550 $m^2/m^3$, 600 $m^2/m^3$, 650 $m^2/m^3$, 700 $m^2/m^3$, 750 $m^2/m^3$, 800 $m^2/m^3$, 850 $m^2/m^3$, 900 $m^2/m^3$, 950 $m^2/m^3$, or 1000 $m^2/m^3$, including any value and range therebetween.

The term "surface area", in the above text and in the text which follows, it is to be understood as meaning the surface area which may be occupied by the biofilm.

Reactor 110 may have collecting unit 192. Collecting unit 192 may define a part of, or may be disposed in fluid communication with, container 120.

As used herein throughout, the term "fluid communication" means fluidically interconnected, and refers to the existence of a continuous coherent flow path from one of the components of the system to the other if there is, or can be established, liquid and/or gas flow through and between the ports even if there exists a valve between the two conduits that can be closed, when desired, to impede fluid flow therebetween. The term "port" refers to a path for distributing liquid or gas, either on or above ground surface or underground, which may include but is not limited to one or more ducts, pipes, channels, tubes, troughs or other means for distribution. Likewise, as may be seen, the terms "upstream" and "downstream" are referred to the direction of flow of the fluid.

Herein, the term "headspace" generally may refer to a region of the interior of the reactor above the level of any liquid or product contained therein. The headspace may further include the gas spaces between carriers 130. It is to be understood, however, that this term also encompasses the situation where what is defined as the "headspace" is a closed void formed beneath the closure cap, for example by means of a seal, labyrinth or baffle.

Reactor 110 may have an outlet line 194. Outlet line 194 may be disposed in fluid communication with collecting unit 192.

Reactor 110 may have valve 180. Valve 180 may be disposed in or adjacent to outlet line 194 and may be configured to allow purified water to exit reactor 110. Reactor 110 may have drain controller 190. Drain controller 190 may allow to monitor and/or control desired level of water within collecting unit 192. Reactor 110 may have a recycling outlet 196. Recycling outlet 196 may allow water to exit collecting unit 192 so as to recirculate the water exiting from collecting unit 192 to water inlet 140.

Optionally, reactor 110 is operated under an unsaturated flow regime.

Figure 1B:
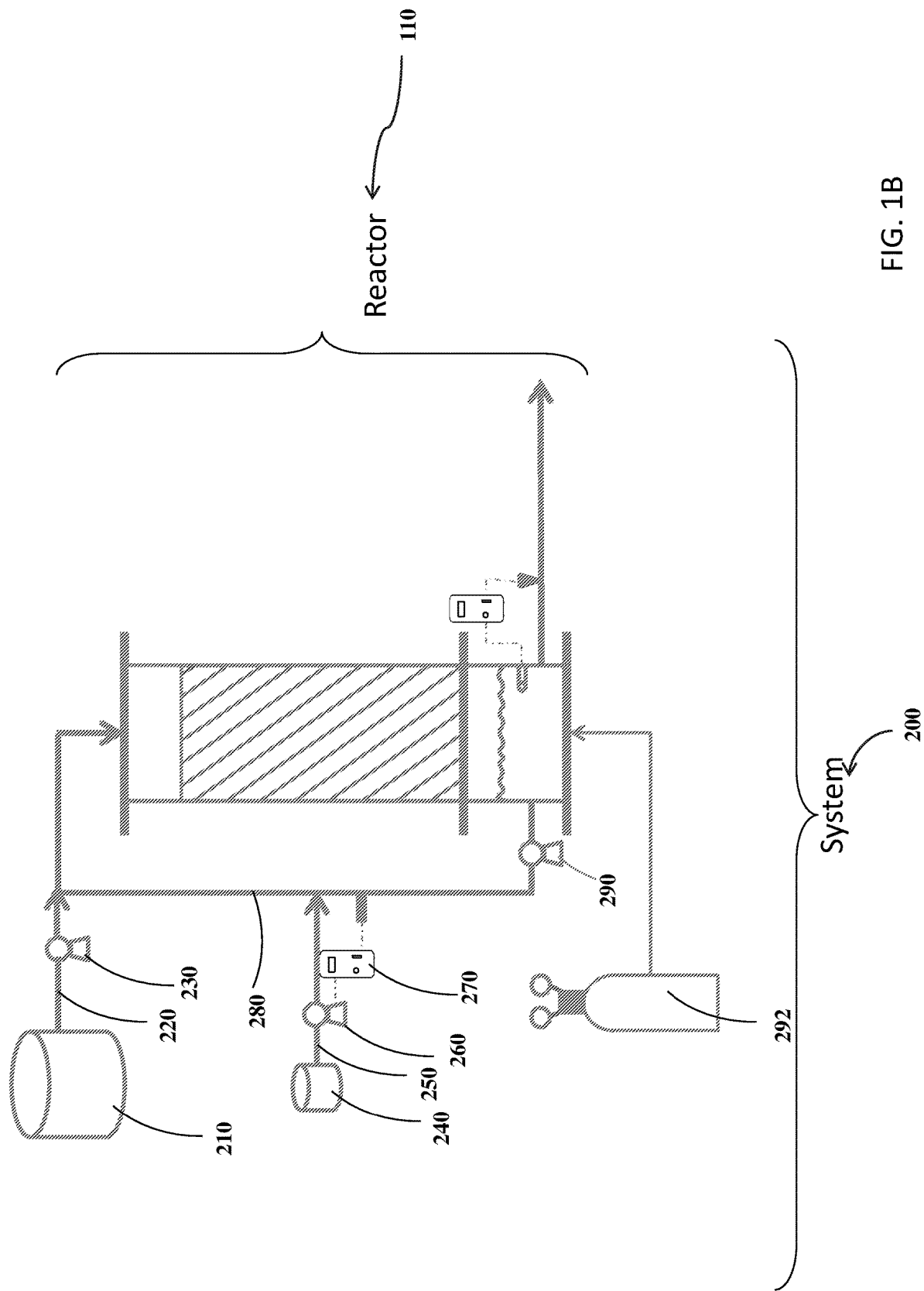

Optionally, water is recirculated via pipe (as shown in FIG. 1B hereinbelow; pipe 280) and trickled over biofilm carriers 130. Optionally, reactor 110 is continuously fed with nitrate-contaminated water (e.g., groundwater). Optionally, when a certain amount of liquid collects at the bottom of reactor 110 and reaches a level switch, drain valve 180, described in FIG. 1A is opened and treated water is released (i.e. pulsed discharge). Optionally, the inner gas phase of reactor 110 is closed to the atmosphere. Optionally, the inner gas phase of reactor 110 is pressurized by the supplied $H_2$ and the $N_2$ formed during denitrification. An additional source of $N_2$ gas may be atmospheric $N_2$ dissolved in the influent water and carried into the reactor.

Optionally, reactor 110 is operated in mode of continuous feed and drain valve 180 is operated in pulsed discharge mode.

Optionally, the bacteria may be selected from *Acinetobacter, Alcaligenes, Agrobacterium, Aquaspirillum, Azospirillum, Bacillus, Brad rhizobium, Chromobacterium, Corynebacterium, Cytophaga, Flavobacterium, Gluconobacter, Hyphomicrobium, Kingella, Moraxella, Neisseria, Nitrosomonas, Paracoccus, Pseudomonas* (e.g. *P. aeruginosa* and *P. fluorescens*), *Rhizobium, Rhodopseudomonas, Thermothrix, Thiobacillus, Thiomicrospira, Thiosphaera*, or a combination thereof.

Hence, the term "biofilm" refers to an aggregate of living cells which adhere to each other and/or substantially immobilized onto a surface as colonies. In some embodiments, the cells are frequently embedded within a self-secreted matrix of extracellular polymeric substance (EPS), also referred to as "slime", which is a polymeric sticky mixture of nucleic acids, proteins and polysaccharides.

In some embodiments, the reactor is hydrogenotrophic reactor. In some embodiments, reactor 110 contains one or more carriers 130 in the inner volume thereof. In some embodiments, carriers 130 contains denitrifying bacterial biofilm.

In some embodiments, reactor 110 contains a water inlet configured to provide contaminated water to reactor 110. In some embodiments, reactor 110 contains a gas inlet configured to direct a flow of gas into the reactor.

In some embodiments, the gas is hydrogen.

In some embodiments, the reactor's gas phase is closed to the atmosphere.

The term "hydrogenotrophic" refers to converting hydrogen to another compound, e.g., by a microorganism as part of its metabolism.

In some embodiments, the system allows a process of removing nitrate from the water and forming a product water having reduced nitrate content, as further described hereinbelow.

Reference is now made to FIG. 1B which shows a schematic illustration of an exemplary system comprising the reactor as described in some embodiments thereof. It is to note that any elements described in system 200 may be co-located in reactor 110 as a single module.

System 200 may be devoid of a gas-phase passage. A gas-phase passage might allow the gas exiting from reactor 110. System 200 may have a housing. The housing may be made of a rigid, durable material, such as, without limitation, aluminum, stainless steel, a hard polymer and/or the like. The housing may have a cylindrical, conical, rectangular or any other suitable shape. The housing may prevent unwanted foreign elements from entering thereto.

System 200 may have water feed 210. Water feed 210 may allow to store contaminated water therein. System 200 may have first pipe 220. First pipe 220 may allow water to pass from water feed 210 to reactor 110. System 200 may have first pump 230. First pump 230 may control or monitor the flow rate of the contaminated water entering reactor 110 via pipe 220.

System 200 may have acid container 240. Acid container 240 may allow to store an acid solution therein. System 200 may have second pipe 250. Second pipe may allow acid solution to pass from acid container 240 to reactor 110. System 200 may have second pump 260. Second pump 260 may control or monitor the flow rate of the acid solution entering reactor 110 via second pipe 250.

System 200 may have pH control unit 270. pH control unit 270 may be connected to second pump 260. pH control unit 270 may control second pump 260.

Reactor 110 or system 200 may have a pressure sensor allowing to monitor and/or control the gass pressure inside reactor 110 (e.g., inside headspace 160).

System 200 may have third pipe 280. Third pipe 280 may be attached to, or integrally formed with at least a first part of reactor and with a second part of reactor 110. Pipe 280 may allow to recirculate the water from a second part of reactor 110 to the first part of reactor 110. The first part (also referred to as "upper part") may have higher gravitational potential energy than the second part (also referred to as "lower part").

System 200 may have third pump 290. Third pump 290 may control or monitor the flow rate of the contaminated water re-entering reactor 110 via pipe 280.

System 200 may have gas source (e.g., cylinder) 292. Gas source may have gas. Pipe may allow to pass gas (e.g., $H_2$) from gas source 292 into reactor 110 (e.g., via inlet 150 described in FIG. 1A).

Conditions may be monitored using any suitable type monitoring devices e.g., a computer-implemented system. Variables that may be tracked include, without limitation, pH, temperature, conductivity, turbidity, dissolved nitrate concentration, dissolved oxygen, as well as the concentrations of nitrate. These variables may be recorded throughout reactor 110 or system 200 described hereinbelow.

A monitoring device or a control unit (e.g., computer) may also be used to monitor, control and/or automatize the operation of the various components of the reactors or systems disclosed herein, including valves, sensors (e.g., a pressure sensor), weirs, blowers, fans, dampers, pumps, etc.

In some embodiments of the invention, the system is outfitted with a pump, e.g., feeding pump and/or a recirculation pump so as to further fluidize the water.

According to an aspect of some embodiments of the present invention there is provided a method for removing nitrates from contaminated water.

For waters with high nitrate concentrations (>60 mg $NO_3^-$-N/L), the system 200 may be configured to obtain continuous discharge of $N_2$ gas necessary in order to enable operation under moderate pressures. This configuration may be addressed in a either batch or continuous mode operation. In some configuration, system 200 contains two or more reactors 110 connected by hydraulic recirculation.

Figure 1C:
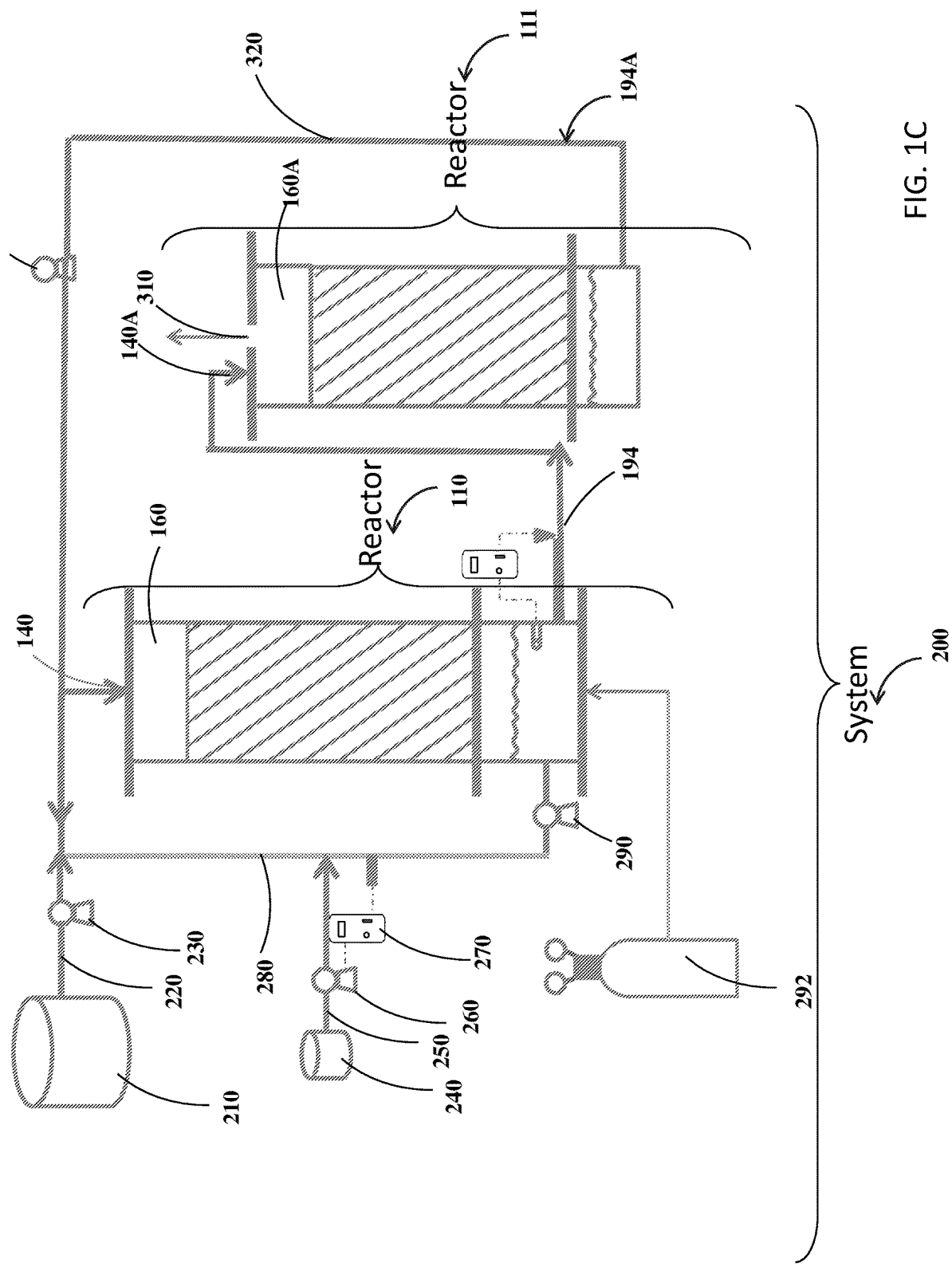

Reference is now made to FIG. 1C which presents another exemplary configuration of system 200 containing two reactors: reactor 110 (also referred to interchangeably as "first reactor 110", "first unit 110", "main pressurized hydrogenotrophic unit 110", or "main unit 110"), and "second reactor 111" (also referred to as "second unit 111", or "$N_2$ gas discharge unit 111"). Second unit 111 may have inlet 140A and outlet line 194A as described in first unit 110. First reactor 110 may be connected to second reactor 111 such that outlet line 194 of first reactor 110 may be connected to inlet 140A of second reactor 110, and outlet line 194A of second reactor 111 may be connected to inlet 140 of first reactor 110. In exemplary configuration, headspace 160A of second unit 111 may contain outlet 310. Second unit 111 may be not pressurized and open to atmosphere. Second unit 111 may be based on an unsaturated flow regime where water is trickled over plastic carriers in order to enhance $N_2$ gas release from water and venting to atmosphere. This exemplary configuration of system 200 may allow to enhance the denitrification rate. Other elements presented in FIG. 1C are described in FIGS. 1A and 1B.

Outlet 310 may allow $N_2$ gas to release therefrom. In exemplary configuration, system 200 contains pipe 320. Pipe 320 may allow to recirculate water from second unit 111 to first unit 110. In exemplary configuration, system 200 contains pump 324.

Pump 324 may assist water to recirculate in pipe 320. In exemplary configuration, first unit 110 may be either saturated, unsaturated or submerged.

In exemplary configuration, a batch or continuous removal of nitrate in the concentration above e.g., 1, 2, 3, 4, 5, 10, 15, 20, 25, 30, 35, 40, 45, 50, 55, or 60 mg per liter as nitrate nitrogen (N) is allowed. First unit may have pressurized unsaturated flow with internal hydraulic recirculation. Second unit may have unsaturated flow open to atmosphere (i.e. unpressurized).

Reference is now made to FIG. 1D which presents another exemplary configuration of system 200. The configuration shown in FIG. 1D presents reactor 110 based on saturated flow regime in a form of submerged biological filter (BF) where hydrogen gas is bubbled and recirculated through the biofilm covered plastic carriers in the saturated zone. In exemplary configuration of system 200, pipe 280 may allow to recirculate the gas (e.g., $H_2$ and/or $N_2$) from a second part of reactor 110 to the first part of reactor 110. As noted hereinabove, the first part may have higher gravitational potential energy than the second part. In exemplary configuration, system 200 may have blower 291. Blower 291 may control or monitor the flow rate of the gas via pipe 280.

In exemplary configuration of system 200 drain controller 190A may have higher gravitational potential energy than carrier 130. Other elements presented in FIG. 1D are described in FIGS. 1A and 1B.

Typically, but not exclusively, while entering the reactor, the contaminated water is characterized by a $NO_3^-$—N concentration of e.g., above 10 mg/L, e.g., 15 mg/L, 20 mg/L, 25 mg/L, 30 mg/L, 35 mg/L, 40 mg/L, 50 mg/L, 60 mg/L, 70 mg/L, 80 mg/L, 90 mg/L, or 100 mg/L, including any value therebetween. Hereinthroughout, the term: "$NO_3$—N", refers to the mass of N derived from the corresponding ion $NO_3^-$.

In some embodiments, the denitrification is carried out using a gas. In some embodiments, the gas serves as an electron donor. The term "electron donor" refers to a reducing agent. The terms "reducing agent", or "reduction agent", refer to a material, which reacts with a second material and causes the second material to gain electron(s) and/or decreases the oxidation state of the second material. Exemplary electron donors include, but are not limited to, methane, hydrogen gas, and compounds containing carbon to carbon double bonds attached to an aromatic ring.

In exemplary embodiments, the electron donor is a gas e.g., $H_2$.

In some embodiments, the flow rate of the gas e.g., $H_2$, ranges from 0 to 7 gr $H_2$/(Liter$_{reactor}$*day). In some embodiments, the flow rate of the gas, e.g., $H_2$, is 0, 1, 2, 3, 4, 5, 6, or 7 gr $H_2$/(Liter$_{reactor}$*day), including any value therebetween.

In exemplary embodiments, the contaminated water (also referred to as: "feed solution") is dosed with $KH_2PO_4$ and or $NaNO_3$.

In exemplary embodiments, the temperature within the reactor remains constant, within ±20% variation. In exemplary embodiments, the temperature within the reactor is about e.g., 10° C., 15° C., 20° C., 25° C., 30° C., 35° C., or 40° C., including any value therebetween.

In some embodiments, the pH is adjusted to, or kept in the desired value using an acid. In some embodiments, the acid is a hydrochloride acid (HCl).

In some embodiments, the pH is adjusted to, or kept in a value of e.g., 6, 7, or 8, including any value therebetween.

In some embodiments, reactor 110 further comprises denitrifying bacteria. The term "denitrifying bacteria" refers to any bacteria capable of denitrification.

Typically, but not exclusively, the denitrification process is outlined according to the following equation:

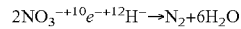

$$2NO_3^- + 10e^- + 12H^+ \rightarrow N_2 + 6H_2O$$

In some embodiments, the reactor is pressurized by the supplied $H_2$ and the $N_2$ formed during denitrification. In some embodiments, an additional source of $N_2$ gas is atmospheric $N_2$ dissolved in the influent water and carried into the reactor. In some embodiments, during the operation of reactor 110, the total pressure of $H_2$ and $N_2$ varies within a range of ±20%.

In some embodiments, inner volume of the reactor is pressurized by a total absolute pressure that ranges from 1 to 15 bars, or in some embodiments from 1 to 12 bars, or in some embodiments from 2 to 5 bars, or in some embodiments from 1 to 5 bars, or in some embodiments from 2 to 3 bars, or in some embodiments from 1.5 to 3 bars.

In some embodiments, the partial pressure of hydrogen ranges from 0 to 5 bars, or in some embodiments from 0.5 to 5 bars, or in some embodiments from 0.5 to 3 bars, or in some embodiments from 0.5 to 2 bars.

In some embodiments, the method is characterized by a denitrification rate of e.g., 0, 0.1, 0.2, 0.3, 0.4, 0.5, 0.6, 0.7, 0.8, 0.9, 1, 2, 3, 45, 6, 7, 8, 9, 10, 15, 20, 25, 30, 35, 40, 45, 50 or even 100 gram $NO_3^-$—N/(Liter$_{reactor}$*day) at 25° C., including any value therebtween.

In some embodiments, the method comprises keeping pH of the water in reactor 110 or in system 200 at a value that ranges from e.g., about pH 6 to about 9, or about 7. In some embodiments, the pH is kept at a value of 7 to 9 by an addition of acid solution into reactor 110 or system 200. In some embodiments, the acid is hydrochloric acid.

In some embodiments, the method is performed in a recycle mode, e.g., water is recirculated from the collecting unit to container 210. In some embodiments, the water exiting the collecting unit is recycled to container at least e.g., 1, 2, 3, 4, 5, 6, 7, 8, 9, 10, 11, 12, 12, 13, 14, 15, 16, 17, 18, 19, or 20 times.

In some embodiments, the water exiting reactor 110 or system 200 is characterized by a concentration of $NO_3^-$—N (in mg of $NO_3^-$—N per liter) being below 20, 19, 18, 17, 16, 15, 14, 13, 12, 11, 10, 10, 9, 8, 7, 6, 5, 4, 3, 2, or 1.

In some embodiments, the method comprises a further step of diluting contaminated water by the water exiting reactor 110 or system 200.

It is noteworthy, without being bound by any particular theory, that nitrogen gas content in water exiting reactor 110 depends on temperature and on the amount of nitrate degraded, while assuming an amount of 13 mg/L $N_2$ being dissolved in water due to equilibrium with free air at 25° C.

Typically, in a typical feed content in contaminated groundwater of up to 40 mg/L of $NO_3^-$—N, the nitrogen gas content is about 60 $N_2$ mg/L if all $NO_3^-$—N are degraded. It is further noteworthy, that short time after the water exits the reactor 110 or system 200, dissolved $N_2$ may be released to the atmosphere and finally the content of $N_2$ in the water will revert to a value of 13 mg/L.

According to an aspect of some embodiments of the present invention, there is provided a method of denitrifying water, the method comprising contacting nitrate contaminated water with bacterial biofilm and with $H_2$, wherein the method is characterized by a constant increase in $N_2$ concentration dissolved in the water accompanied by constant decrease in $H_2$ pressure. In some embodiments, the constant increase in $N_2$ concentration dissolved in the water accompanied by constant decrease in $H_2$ pressure occurs until the partial pressures of $N_2$ and $H_2$ gases remain constant. In some embodiments, total absolute pressure ranges from 1 to about 12 bars. In some embodiments, the partial pressure of hydrogen ranges from 0 to 5 bars, or in some embodiments from 0.5 to 5 bars, or in some embodiments from 0.5 to 3 bars, or in some embodiments from 0.5 to 2 bars. In some embodiments, the total absolute pressure ranges from 1 to about 12 bars. In some embodiments, the concentration of $N_2$ dissolved in the water is e.g., 10 mg/L, 20 mg/L, 30 mg/L, 40 mg/L, 50 mg/L, 60 mg/L, including any value therebetween.

In some embodiments, there is provided a method of denitrifying contaminated water, using a reactor, wherein the reactor provides with a headspace that seals, or is sealed from, the inner volume of the reactor to the atmosphere, the method comprising the steps of: introducing contaminated water to the thereby contacting a contaminated water with carriers, wherein the carriers comprise a denitrifying bacterial biofilm thereon; and introducing a gas into the reactor.

General:

As used herein the terms "approximately" and "about" which are used hereinthroughout interchangeably refer to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

In addition, where there are inconsistencies between this application and any document incorporated by reference, it is hereby intended that the present application controls.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples which, together with the above descriptions, illustrate the invention in a non limiting fashion.

Example 1

Materials and Methods

Experimental system: The reactor used for all tests is illustrated in FIG. 1A. The system comprising the reactor used for all tests is illustrated in FIG. 1B.

Exemplery configuration comprises a cylindrical reactor, 71 cm in height and 10.5 cm in diameter divided into two unequal parts. The top part of the reactor (height 51 cm) contains plastic biofilm carriers (active surface of 650 $m^2/m^3$, Aqwise) and is separated by a metal screen from the bottom part (height 20 cm) of the reactor where recirculating water collected. The reactor is connected to a gas supply ($H_2$ cylinder with pressure regulator), feed pump (Diaphragm pump model 7090-42, Cole-Palmer), recirculation pump (FL-2403, ProPumps) and pH controlling unit (standard pH electrode, pH controller—pH190, Alpha; hydrochloric acid tank and acid pump—gamma/ L, ProMinent). In exemplery procedures, to ensure even flow, a water distributor was situated at the top-inside part of the reactor.

For reactor start-up, a 2 L solution consisting of tap water enriched with nitrate, bicarbonate and phosphate with 0.5 L bacteria originating from a former hydrogenotrophic reactor was prepared and recirculated through the reactor under a constant hydrogen pressure of 2 bars. The feed solution for all experiments was tap water mixed with concentrated stock solutions of $NaNO_3$ and $KH_2PO_4$. Recirculation flow rate was 2.5 L/min for all experiments. Water temperature was maintained constant at 25.5±1° C. pH was kept at 7.1 by dosing hydrochloric acid. The relatively low pH was aimed to prevent an extreme pH increase within the biofilm, which leads to nitrite accumulation. Influent and effluent water were collected for further analyses.

Example 2

Analyses

In exemplary procedures, nitrate was determined using a Metrohm 761 ion chromatograph (IC) equipped with a 150 mm Metrosep A Supp 5 column with column guard and suppressor using a $CO_3^{-2}/HCO_3^-$ eluent. Nitrite and alkalinity were measured according to Standard Methods (Method 4500 and Method 2320, respectively). Hydrogen concentration in gas phase was measured by gas chromatography (TCD detector; column: HP-PLOT-Q 30 m; 0.53 mm. 40u, Agilent 7890A). Samples for the gas phase analysis in gas chromatography were taken by direct injection of fresh gas mixture from the reactor headspace into a 20 mL sealed serum bottle. The bottle was first flushed with the same gas mixture from the reactor headspace for 1 minute with gas flow rate of 250 mL/min to ensure exchange of the entire gas volume in the bottle. The hydrogen concentration in liquid phase was measured by headspace analysis of effluent samples immediately sealed within a serum bottle using the same gas chromatograph.

Example 3

Test Protocols

Effect of hydrogen and nitrate concentrations on denitrification rates: In exemplary procedures, denitrification rates of the proposed reactor were tested for various combinations of hydrogen pressure and effluent $NO_3^-$—N concentration. For each trial, the system was first operated to steady state with high effluent $NO_3^-$—N concentration (>15 mg/L) and hydrogen pressures in the range of 0.5 to 2 bars (total reactor pressure of 1.5-3 bars). During operation to steady state, the partial pressure of $N_2$ gas increased and the partial pressure of $H_2$ decreased till a gas-liquid equilibrium was achieved. For the current research purposes, steady state was defined as an operational state presenting constant denitrification rate with constant partial pressures of both $H_2$ and $N_2$ gases during extended operation. After reaching steady state, the effluent $NO_3^-$—N concentration was decreased gradually by adjusting the influent $NO_3^-$—N concentration and the denitrification rate was calculated for each combination of hydrogen pressure and effluent $NO_3^-$—N concentration as described below. The inlet $NO_3^-$—N concentration was operated in the range of 3 to 35 mg/L and the flow rate was kept constant on 450 ml/min. Reactor cleaning by flushing with water was carried out every few days to remove excess biomass growth. The frequency of cleaning depended on the denitrification rate achieved for different operational parameters.

Proof of Concept—Reaching a Gas-Liquid Equilibrium

Figure 2:
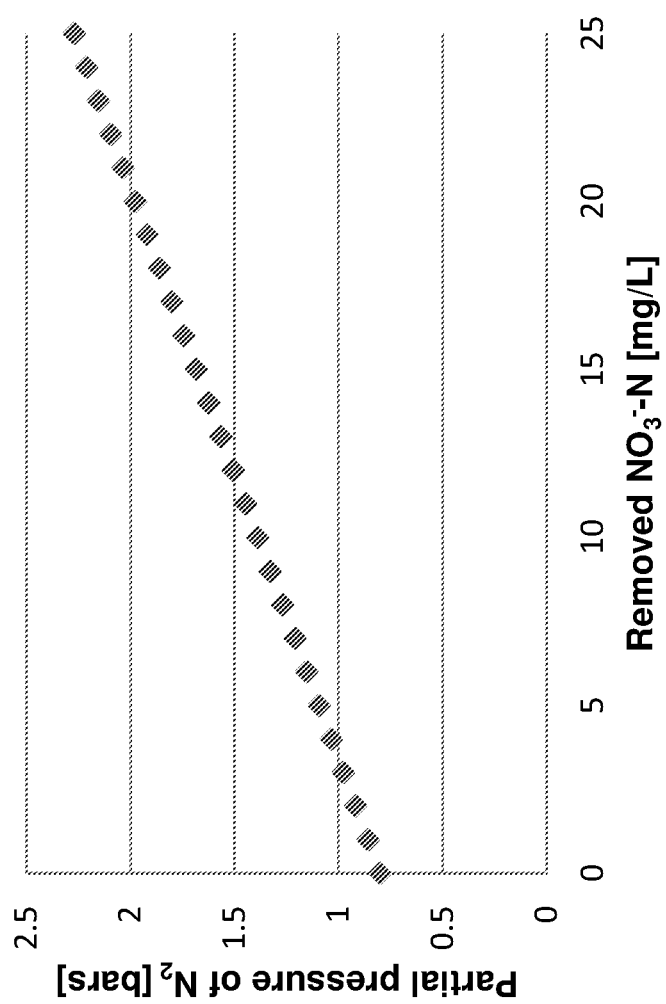
FIG. 2 presents a point graph presenting partial pressure of $N_2$ in the reactor at gas-liquid equilibrium and 25° C., as a function of $NO_3^-$—N removed.
Figure 3:
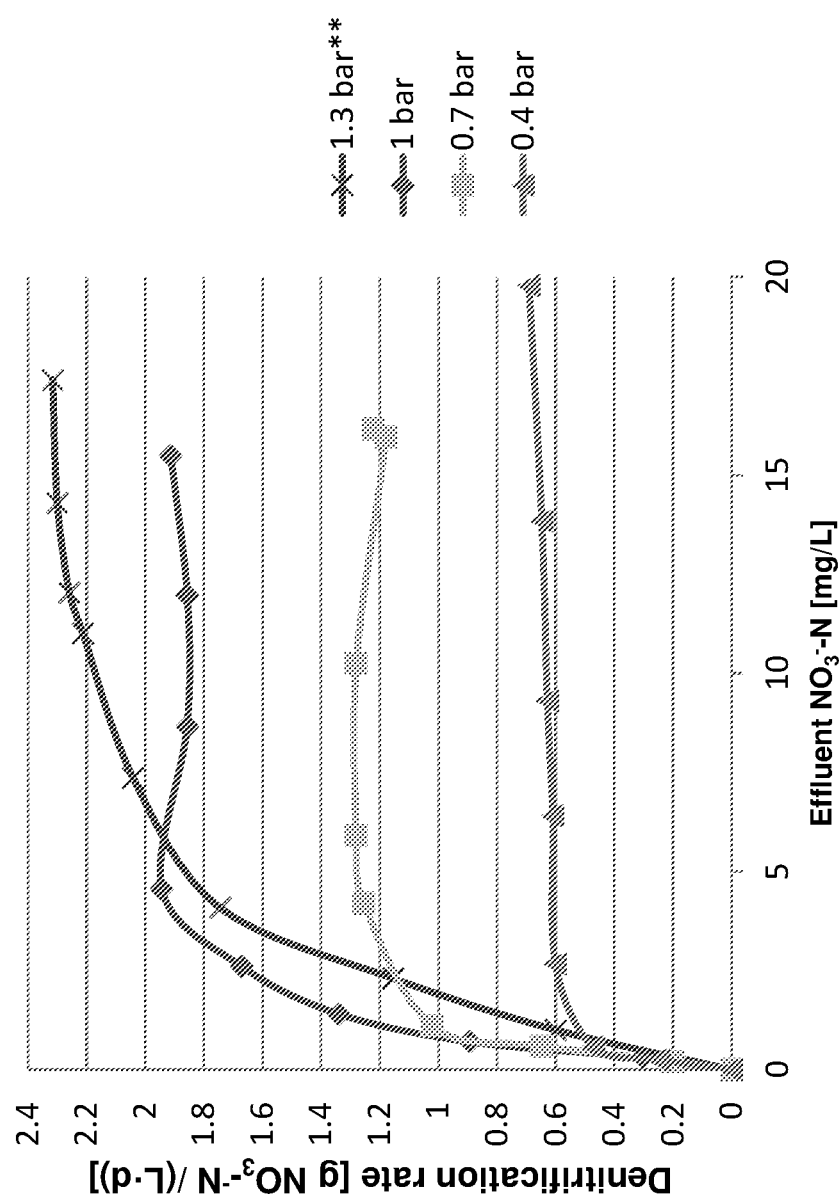
FIG. 3 presents a line graph showing denitrification rate as a function of effluent $NO_3^-$—N concentration for 4 different $H_2$ partial pressures of 0.4, 0.7, 1 and 1.3 bars (gauge). For the experiment with 1.3 bar, the reactor was maintained at pH 6.8 (as further described in the Examples section below)

After investigating the effect of hydrogen and nitrate on denitrification rates, the concept of reaching a steady state with constant partial pressures of both $H_2$ and $N_2$ gases was further tested for two operational conditions: (i) operation with high effluent $NO_3^-$—N concentration according to a drinking water regulation of 10 mg/L, and (ii) operation with low effluent $NO_3^-$—N concentration (~1 mg/L) suitable for split treatment. The inlet $NO_3^-$—N concentration was 25 mg/L for both operation modes. The flow rates applied for operation mode (i) and (ii) were 430 and 130 mL/min, respectively. For each operation mode, the total pressure applied was determined by summing the theoretical $N_2$ pressure developed, as shown in FIG. 2, with the $H_2$ pressure needed, as shown in FIG. 3, and as further described below.

Each operation started with pressurizing the reactor with $H_2$ gas to the desired total pressure above the atmospheric pressure (e.g. for total absolute pressure of 3 bars, 2 bars of hydrogen were added above the atmospheric pressure). As discussed above, $N_2$ gas exchanges $H_2$ gas with time, so that the partial pressure of $N_2$ increases and the partial pressure of $H_2$ decreases. Therefore, the concentration of $H_2$ gas in the reactor headspace was measured over time and converted to partial pressure. Assuming $H_2$ and $N_2$ are the only gases in the reactor (after initial oxygen depletion), the partial pressure of $N_2$ gas could also be calculated by subtracting the partial pressure of $H_2$ from the total pressure. At the beginning of the process, this subtraction gives the partial pressures of both $N_2$ and $O_2$.

Results

Effect of Hydrogen and Nitrate Concentrations on Denitrification Rates

Since phosphate was given in excess and sufficient amount of alkalinity (~115 mg/L as $CaCO_3$) was present in the inlet water, it was assumed that hydrogen and nitrate were the potential rate limiting substrates for denitrification. FIG. 3 presents the denitrification rates calculated after reaching steady state, as a function of effluent $NO_3^-$—N concentration for 4 different $H_2$ partial pressures of 0.4, 0.7, 1 and 1.3 bars.

A similar trend was observed for all hydrogen pressures tested. Nitrate was limiting at low $NO_3^-$—N concentrations (e.g. $NO_3^-$—N<~5 mg/L for experiment with 1 bar). At higher $NO_3^-$—N concentrations (e.g. $NO_3^-$—N>~5 mg/L for experiment with 1 bar) hydrogen was found to be limiting. FIG. 3 shows clearly the potential of the proposed reactor to operate at high denitrification rates as compared to previously reported hydrogenotrophic systems with a maximal rate of 2.2 g $NO_3^-$—N/($L_{reactor}$·d) for operation with hydrogen pressure of 1.3 bars and 10 mg/L of effluent $NO_3^-$—N achieved.

In general, with higher hydrogen partial pressure, higher denitrification rates can be achieved and the $NO_3^-$—N concentration in which the transition to hydrogen limitation occurs is also higher. This also means that for higher hydrogen pressure, penetration to deeper biofilm layers occurs with the resulting higher pH rise in the biofilm. Previous reports link high pH to nitrite accumulation (Glass and Silverstein, 1998; Rezania et al., 2005). At bulk pH of 7.1, nitrite accumulation in the effluent was negligible for the experiments with 0.4, 0.7 and 1 bars for all effluent $NO_3^-$—N concentrations. However, when a pressure of 1.3 bars was tested together with effluent $NO_3^-$—N concentrations of 7 mg/L and higher, an effluent $NO_2^-$—N concentration of around 2 mg/L was measured, probably due to the extreme pH rise within the biofilm. Therefore, the bulk pH in the reactor was lowered to 6.8 in this case and effluent nitrite did not appear. The operation under lower bulk pH may lead to a slight inhibition of bacterial activity in the outer layers of the biofilm, which can also explain the moderate shift of the curve to the right in the case of operation under pressure of 1.3 bars.

Proof of Concept Reaching a Gas-Liquid Equilibrium:

After determining the effect of hydrogen and nitrate concentrations on denitrification rates in the hydrogenotrophic reactor, two operational modes with different effluent $NO_3^-$—N concentration and total pressure were chosen (Table 1) for proving the concept of reaching gas liquid equilibrium in a pressurized reactor. In Table 1, the total pressure in the reactor needed to achieve a maximal denitrification rate for a specific effluent $NO_3^-$—N concentration was determined by combining the information presented in FIG. 2 (nitrogen partial pressure) and FIG. 3 (hydrogen partial pressure).

Table 1 below presents detailed parameters of operation modes tested for proving the concept of reaching a gas-liquid equilibrium.

TABLE 1

| Mode | Purpose of operation mode | Inlet $NO_3^-$—N [mg/L] | Effluent $NO_3^-$—N [mg/L] | $N_2$ pressure developed in 25° C. (FIG. 2) [bars] | $H_2$ pressure needed for maximal rate (FIG. 3) [bars] | Total pressure needed [bars] |
|---|---|---|---|---|---|---|
| 1 | Meeting worldwide regulations for nitrate in groundwater | 25 | 10 | 1.7 | 1.3 | 3 |
| 2 | Producing effluent with low $NO_3^-$—N concentration (suitable for split treatment) | 25 | 0-1 | 2.3 | 0.7 | 3 |

Figure 4:
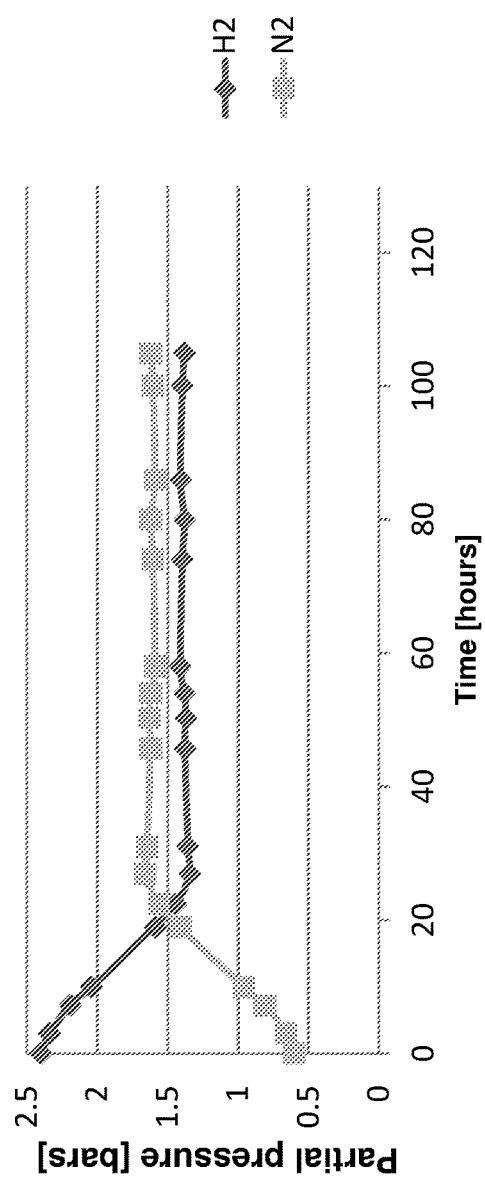
FIG. 4 presents partial pressure of $H_2$ (diamonds) and $N_2$ (squares) gases in the reactor headspace as a function of time for operation mode 1 (effluent $NO_3^-$—N=1 mg/L) as described in the Examples section.
Figure 5:
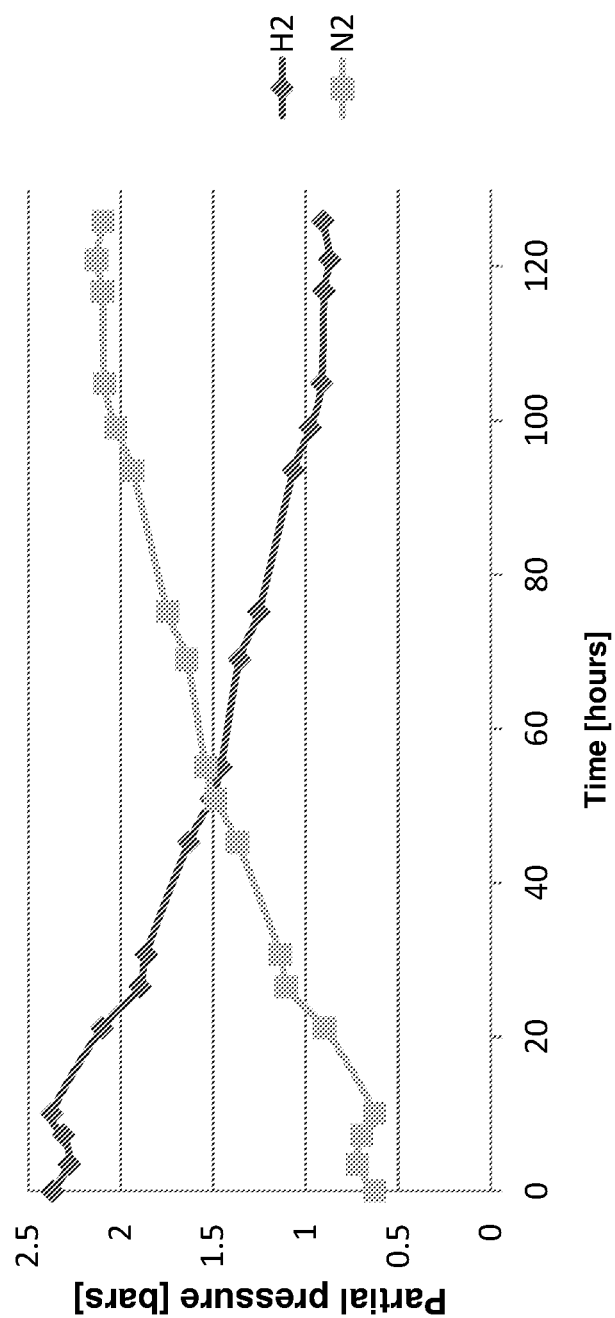
FIG. 5 presents partial pressure of $H_2$ (diamonds) and $N_2$ (squares) gases in the reactor headspace as a function of time for operation mode 2 (effluent $NO_3^-$—N=1 mg/L) as described in the Examples section.

According to Table 1, for both operation conditions at t=0 the reactor was pressurized to 3 bars by introducing 2 bars of $H_2$ gas above atmospheric pressure, and hydrogen concentration in the reactor headspace was measured over time. FIGS. 4 and 5 present the partial pressures of $H_2$ and $N_2$ gases in the reactor headspace as a function of time for operation modes 1 and 2, respectively.

In general, a similar trend was observed for both operational modes. A constant increase in $N_2$ pressure (accompanied by constant decrease in $H_2$ pressure) occurred till a gas-liquid equilibrium was achieved and the partial pressure of both gases remained constant as hypothesized. The rate of increase in the partial pressure of $N_2$ before equilibrium was reached was proportional to the denitrification rate. The average denitrification rates calculated for operation mode 1 and 2 were 2.1 and 1.06 g $NO_3^-$—N ($L_{reactor}$·d), respectively. The final partial pressures of $N_2$ achieved for operation mode 1 and 2 were 1.6 and 2.1, respectively. This small deviation from theoretical calculations for steady state $N_2$ pressures, as shown in Table 1, can be attributed to incomplete mixing of the gases in the reactor column and the density differences between $H_2$ and $N_2$ gases. The concentration of $N_2$, the heavier gas, was a bit lower than expected at the top of the reactor where the gas was sampled. This phenomenon is even more prominent at the beginning of the process when $H_2$ gas was introduced into the reactor, and might explain the initially higher than expected measured partial pressure of $H_2$. Alternatively, the fact that the reactor is not a true completely mixed system results in higher $NO_3N$ concentration in the upper part (i.e. less $NO_3^-$—N removed) with the corresponding lower partial pressure of $N_2$ produced according to the theory presented in section 2. The delay in the increase of the partial pressure of $N_2$ gas at the beginning of operation mode 2 (0<t<10 h) is probably due to oxygen utilization combined with a lower denitrification rate.

At gas-liquid equilibrium (23 h and 105 h for operation modes 1 and 2, respectively), the residual $H_2$ concentrations in liquid phase (e.g. effluent $H_2$ that was not consumed) were 0.5 and 0.34 mg/L for operation modes 1 and 2, respectively. According to the stoichiometry of hydrogenotrophic denitrification, these dissolved $H_2$ concentrations correlate with $H_2$ gas utilization efficiencies of 92.8 and 96.9% for operation modes 1 and 2, respectively.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A reactor comprising:
    (i) a container configured to contain one or more carriers configured to allow a growth of denitrifying bacterial biofilm, wherein said carriers are characterized by a surface area that ranges from 100 to 1000 $m^2/m^3$;
    (ii) a water inlet configured to provide contaminated water to said reactor; and
    (iii) a gas inlet configured to direct a flow of gas into said reactor so as to pressurize said reactor with said gas, so as to maintain a partial pressure of said gas within said reactor ranging from 0.5 to 5 bars;
    wherein:
    said reactor provides a headspace that seals the inner volume of said reactor to the atmosphere, and said reactor being devoid of a gas-phase passage allowing the gas to exit therefrom;
    and wherein said gas is an electron donor gas.

2. The reactor of claim 1, further comprising a collecting unit which defines a part of, or is disposed in fluid communication with, said container.

3. The reactor of claim 2, further comprising an outlet line disposed in fluid communication with said collecting unit, and optionally a valve, wherein said valve is disposed in said outlet line and is configured to allow purified water to exit said reactor.

4. The reactor of claim 1, wherein the gas is hydrogen.

5. A system comprising the reactor of claim 2 and a gas source.

6. The system of claim 5, further comprising a pH controlling unit, and optionally further comprising a pressure sensor.

7. The system of claim 5, further comprising a pipe configured to recirculate the water from said collecting unit to said upper part of said reactor.

8. The system of claim 5, further comprising an external reactor or a container, said external reactor or container being open to the atmosphere and being in fluid communication to said reactor provided with said headspace.

9. The system of claim 5, further comprising a pipe configured to recirculate the water from said external reactor or container to said reactor provided with said headspace.

10. A method of denitrifying water, the method comprising the steps of:
    (a) providing a reactor, wherein said reactor comprises:
        (i) a container, said container containing one or more carriers characterized by a surface area that ranges from 100 to 1000 $m^2/m^3$, said carriers comprising denitrifying bacterial biofilm thereon,
        (ii) a water inlet and a gas inlet;
        and wherein said reactor provides a headspace that seals the inner volume of said reactor to the atmosphere, and said reactor is devoid of a gas-phase passage allowing the gas to exit therefrom;
    (b) introducing nitrate contaminated water to said reactor from the water inlet, thereby contacting said nitrate contaminated water with the carriers comprising denitrifying bacterial biofilm thereon; and
    (c) introducing a gas into said reactor from said gas inlet, thereby denitrifying the water.

11. The method of claim 10, wherein the gas is hydrogen.

12. The method of claim 10, wherein an inner volume of said reactor is pressurized by a total absolute pressure that ranges from 1 to 12 bars.

13. The method of claim 10, characterized by a denitrification rate of at least 0.2 gram $NO_3^-$—N/($Liter_{reactor}$*day).

14. The method of claim 10, wherein the inner volume of said reactor is characterized by a total pressure of $H_2$ and $N_2$ that varies within a range of ±20%.

15. The method of claim 10, further comprising keeping pH of said water at a value that ranges from pH 6 to 9 by acid addition into said reactor.

16. The method of claim 10, wherein a flow rate of said gas is up to 7 gram $H_2$/($Liter_{reactor}$*day).

17. The method of claim 10, wherein said water is recirculated in said container at least 1 time.

18. The method of claim 10, wherein the water exiting said reactor is characterized by $NO_3^-$—N having a concentration less than 20 mg per liter.

* * * * *